United States Patent
Fox et al.

(10) Patent No.: US 9,529,529 B2
(45) Date of Patent: *Dec. 27, 2016

(54) ACCELERATED DATA ENTRY FOR CONSTRAINED FORMAT INPUT FIELDS

(71) Applicant: INTERNATIONAL BUSINESS MACHINES CORPORATION, Armonk, NY (US)

(72) Inventors: Joshua Fox, Emek Haela (IL); Itai Gordon, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/200,321

(22) Filed: Mar. 7, 2014

(65) Prior Publication Data

US 2015/0113466 A1    Apr. 23, 2015

Related U.S. Application Data

(63) Continuation of application No. 14/059,827, filed on Oct. 22, 2013.

(51) Int. Cl.
*G06F 3/048* (2013.01)
*G06F 3/0488* (2013.01)
*G06F 3/0482* (2013.01)

(52) U.S. Cl.
CPC ......... *G06F 3/04886* (2013.01); *G06F 3/0482* (2013.01); *G06F 3/04883* (2013.01)

(58) Field of Classification Search
CPC . G06F 3/0482; G06F 3/04842; G06F 3/04886

USPC ................. 715/816, 773, 780, 812
See application file for complete search history.

(56) References Cited

U.S. PATENT DOCUMENTS

| | | | |
|---|---|---|---|
| 5,128,672 A | 7/1992 | Kaehler | |
| 5,799,107 A | 8/1998 | Fukuchi | |
| 5,963,666 A | 10/1999 | Fujisaki | |
| 5,966,473 A * | 10/1999 | Takahashi | G06K 9/2054 345/441 |
| 6,400,805 B1 | 6/2002 | Brown | |
| 7,386,731 B2 | 6/2008 | Sanai | |
| 7,568,169 B2 * | 7/2009 | Lee | G06F 3/0482 715/812 |
| 7,602,378 B2 | 10/2009 | Kocienda | |
| 8,078,984 B2 | 12/2011 | Whytock | |
| 8,132,118 B2 | 3/2012 | Danker | |

(Continued)

OTHER PUBLICATIONS

U.S. Appl. No. 14/059,827—Non-Final Office Action mailed Aug. 13, 2015.

(Continued)

*Primary Examiner* — Daeho Song
(74) *Attorney, Agent, or Firm* — Law Office of Jim Boice

(57) ABSTRACT

A processor-implemented method generates a character input from an interface. A plurality of consecutive character rows are presented, simultaneously on a single display, to a user, wherein each one of said plurality of character rows comprises a set of characters. One or more processors receive a selection by a user of a single character in each one of said plurality of character rows to generate a set of user selected characters. The set of user selected characters are then converted into a single complete input.

19 Claims, 4 Drawing Sheets

(56) References Cited

U.S. PATENT DOCUMENTS

| | | | |
|---|---|---|---|
| 8,140,722 B2* | 3/2012 | Ikeda | G06F 3/0237 455/565 |
| 8,185,841 B2 | 5/2012 | Rainisto | |
| 8,463,544 B2* | 6/2013 | Katoh | G01C 21/3611 701/454 |
| 8,612,885 B2* | 12/2013 | Kim | G06F 3/0237 345/168 |
| 8,782,556 B2* | 7/2014 | Badger | G06F 3/0237 715/816 |
| 8,949,743 B2 | 2/2015 | Kida | |
| 2002/0167545 A1 | 11/2002 | Kang et al. | |
| 2003/0020761 A1 | 1/2003 | Yanatsubo | |
| 2003/0154292 A1 | 8/2003 | Spriestersbach | |
| 2004/0059569 A1* | 3/2004 | Sugano | G06F 3/018 704/205 |
| 2004/0153975 A1* | 8/2004 | Williams | G06F 17/276 715/256 |
| 2005/0195159 A1* | 9/2005 | Hunleth | G06F 3/0236 345/156 |
| 2005/0219207 A1* | 10/2005 | Shishido | G01C 21/3611 345/156 |
| 2006/0080618 A1 | 4/2006 | Kracht | |
| 2006/0265648 A1* | 11/2006 | Rainisto | G06F 3/0237 715/259 |
| 2007/0127776 A1 | 6/2007 | Tokunaga | |
| 2007/0209016 A1* | 9/2007 | Takayama | G06F 3/0236 715/780 |
| 2008/0122806 A1 | 5/2008 | Ahn | |
| 2008/0140307 A1* | 6/2008 | Chen | G01C 21/3611 701/532 |
| 2009/0195506 A1 | 8/2009 | Geidl et al. | |
| 2010/0026650 A1 | 2/2010 | Stivastava et al. | |
| 2010/0194690 A1* | 8/2010 | Wilairat | G06F 3/0233 345/168 |
| 2010/0231523 A1* | 9/2010 | Chou | G06F 3/018 345/171 |
| 2010/0265181 A1 | 10/2010 | Shore | |
| 2011/0074704 A1 | 3/2011 | Causey et al. | |
| 2011/0175826 A1 | 7/2011 | Moore | |
| 2011/0264442 A1 | 10/2011 | Huang et al. | |
| 2012/0016862 A1 | 1/2012 | Rajan | |
| 2012/0185617 A1* | 7/2012 | Honma | G06F 3/0237 710/14 |
| 2012/0242582 A1 | 9/2012 | Choi | |
| 2013/0083076 A1 | 4/2013 | Liu et al. | |
| 2013/0125037 A1* | 5/2013 | Pasquero | G06F 17/273 715/773 |
| 2013/0127728 A1* | 5/2013 | Park | G06F 3/017 345/168 |
| 2013/0227031 A1 | 8/2013 | Wells | |
| 2013/0232006 A1* | 9/2013 | Holcomb | G06F 17/30864 705/14.54 |
| 2013/0232401 A1* | 9/2013 | Daga | G06F 17/243 715/225 |
| 2013/0285926 A1 | 10/2013 | Griffin | |
| 2014/0253457 A1* | 9/2014 | Lee | G06F 3/018 345/171 |
| 2015/0139550 A1 | 5/2015 | Kuno | |
| 2015/0193393 A1 | 7/2015 | Violet et al. | |

OTHER PUBLICATIONS

L. Wroblewski, "Forms on Mobile Devices: Modern Solutions", Smashing Magazine, 2010, <http://uxdesign.smashingmagazine.com/2010/03/11/forms-on-mobile-devices-modern-solutions>, pp. 1-14.

Samsung Electronics, "Samsung GT-I9300 User Manual", Samsung Electronics, 2012, pp. 1-181, Relevant pp. 153.

U.S. Appl. No. 14/059,827 Final Office Action Mailed Feb. 26, 2016.

* cited by examiner

ACCELERATED DATA ENTRY FOR CONSTRAINED FORMAT INPUT FIELDS

The present invention is a continuation of U.S. patent application Ser. No. 14/059,827, filed on Oct. 22, 2013, and entitled "Accelerated Data Entry for Constrained Format Input Fields," which is incorporated herein by reference.

BACKGROUND

The present invention, in some embodiments thereof, relates to a data input method and, more specifically, but not exclusively, to a rapid data input on a single display.

Electronic applications often require input field to be filled. In many cases, such as in mobile phones, existing virtual keyboards may cause slow and tedious typing.

Existing fast entering virtual keyboards predicts the next character to be typed by statistic analysis. Some of these virtual keyboards emphasize the predicted characters, for example by color.

Other existing virtual keyboards allow typing by swipe gestures or air gestures to make typing faster.

SUMMARY

In one embodiment of the present invention, a processor-implemented method generates a character input from an interface. A plurality of consecutive character rows are presented, simultaneously on a single display, to a user, wherein each one of said plurality of character rows comprises a set of characters. One or more processors receive a selection by a user of a single character in each one of said plurality of character rows to generate a set of user selected characters. The set of user selected characters are then converted into a single complete input.

In one embodiment of the present invention, a processor-implemented method enables a user to fill an input field on a single display. One or more processors generates an input field on a user interface, wherein the input field has a plurality of character entry subfields and at least one constraint for at least one of said plurality of character entry subfields. A set of characters selected for input from said input field according to said at least one constraint of at least one of said plurality of character entry subfields is received. A virtual keyboard is then generated and presented on a single display, wherein only said set of characters are presented on said virtual keyboard.

In one embodiment of the present invention, a computerized system for creating a virtual keyboard for input in an input field is presented. The computerized system comprises: an input module for receiving input using an input field having a plurality of character entry subfields and at least one constraint for at least one of said plurality of character entry subfields; and a display unit creating a plurality of character rows, each of said plurality of character rows comprises a set of characters; wherein each of said plurality of character rows provides input for one of said character entry subfields; and wherein said set of characters in each one of said plurality of character rows is selected dynamically according to respective said at least one constraint.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
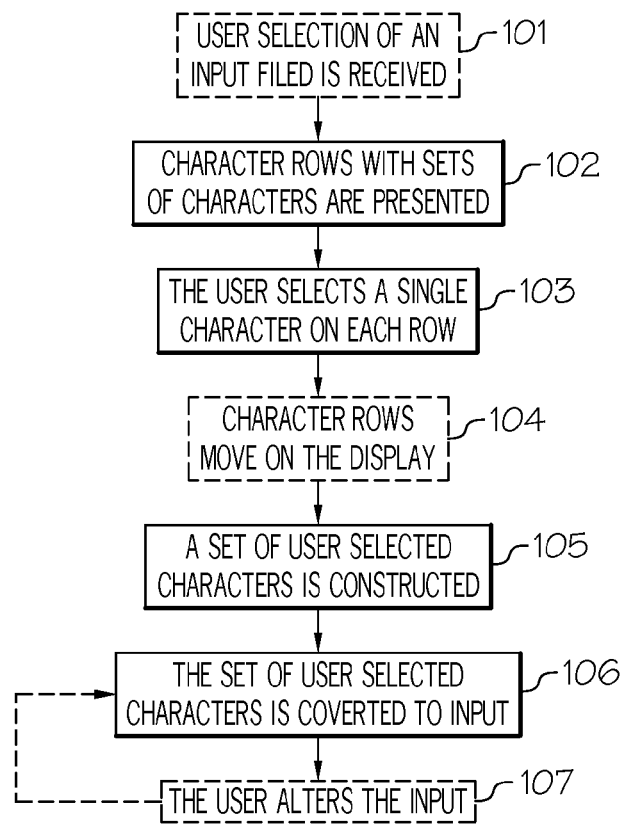
FIG. 1 is a flowchart schematically representing a method of generating a character input from an interface, according to some embodiment of the present invention.

The present invention, in some embodiments thereof, relates to a data input method and, more specifically, but not exclusively, to a rapid data input on a single display.

According to some embodiments of the present invention, there are provided methods and systems of generating a character input from an interface on a single display. A single display may be, for example, a touch screen such as on a mobile phone or a tablet computer, a computer monitor, a projector, an electronic display glasses worn by the user or any other form of electronic display. When a user selects an input field, a set of character rows is presented. Each character row includes a set of characters, for example, numbers, letters, symbols, icons and/or emoticons. The user then selects one character in each character row so a multi character input is constructed.

According to other embodiments of the present invention, there are provided methods and systems of enabling a user to fill an input field on a single display, for input fields that have format constraints. Such input fields are, for example, date, time of day, value of a known property, phone number, street name of a known city and/or identification number. When a user selects an input field, a virtual keyboard is presented, with only a set of characters selected according to the constraints, for each of the character entry subfields of the input field.

These methods provide a faster way of entering input then existing methods. This is mostly important for users who have to repeatedly enter data as part of their workflow. For example, a nurse may have to fill multiple input fields of a patient's information, such as dates, time of day and/or test results.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart schematically representing a method of generating a character input using a user interface, for example a graphical user interface (GUI), according to some embodiment of the present invention.

First, optionally, as shown at 101, an interface containing one or more input fields is presented on a single display to a user, for example, by a display unit, and a user selection of an input field is received, for example, by a processing unit. The input field may be, for example, a component of a web page, an active input interface in a digital document, a field of an application UI, a field of an operating system UI, and/or the like.

Then, as shown at 102, character rows are simultaneously presented to the user on the single display. This may be done, for example, by instructing a display control unit to present the character rows using a processing unit, as a response to a selection of an input field by the user. Each character row includes a set of characters. Optionally, the first character row shows a set of characters for selecting the first character in the input field, the second character row shows a set of characters for selecting the second character in the input field and so on. Optionally, the set of characters is selected according to the type of input required by the input field. For example, when the required input is a number, the first character row contains a set of the 10 digits for selecting the first digit of the input number or, when the required input are words, the first character row contains the letters from "A" to "Z" for selecting the first letter of the first input word.

Optionally, the characters in each one of the character rows are presented in a pre determined order, for example, alphabetic and/or numeric order.

Optionally, the input field has character entry subfields and constraints for some or all of the character entry subfields; and the set of characters in each one of the character rows is selected dynamically according to the constraints of the corresponding character entry subfields. For example, if the input required of the input field is a date, only digits relevant for a date are presented on each character row.

Optionally, the character rows have different sizes, shapes, length and/or positions according to the set of characters in each character row. For example, if the set of characters of the first character row contains 4 characters and the set of characters of the second character row contains only 2 characters, the character rows would have different length, accordingly.

Optionally, the character rows are positioned so as to allow the most likely input to be entered quickly by the user. For example, if the most likely input of a year is "2013", the characters "2" in the first character row, "0" in the second character row, "1" in the third character row and "3" in the fourth character row, are positioned one below the other, accordingly. The most likely input can be determined, for example, by statistical algorithms such as used in many existing virtual keyboards.

Then, as shown at 103, the user selects a single character on each character row. Optionally, the selection is performed by a maneuvered stroke held on top of the character rows so the stroke covers a single character in each one of the character rows. The maneuvered stroke can be performed by a user, for example, by a finger gesture and/or a stylus gesture. Selection by a maneuvered stroke is faster than touching each character separately and may be performed easily on top of character rows, as the user's finger crosses each character row only once. Other forms of selection are possible, for example, by tapping on the screen, by a computer mouse and/or by air gestures.

Optionally, when a touch screen is used, user selection is received from a touch detection unit. The touch detection unit may be, for example, a part of a mobile device's hardware.

Optionally, the character rows dynamically changed in size, shape, length and/or position according to the character selected by the user. For example, character rows may decrease in length as the number of characters in the set is decreased due to a decrease in the number of possible input options as the user selects characters.

Optionally, every character selected by the user is presented on the input field, so the user can see his previously selected characters. For example, when the user selects the character "1" in a character row, the character "1" is presented on the input field.

Optionally, as shown at 104, the character rows move on the display while the user selects characters and new character rows are presented on the display. For example, character rows move upward on a touch screen while the user is touching each character row and new character rows are presented at a bottom of the touch screen. This allows filling input fields that require an input with many characters even when the screen is too small to contain character rows for all the characters. Also, this may save typing time, as the user's finger or stylus moves shorter distance on the screen. Optionally, speed of the character rows movement is a derivative of the speed of the finger or the stylus. This contributes to the user's convenience of typing.

Optionally, the character rows may be rolled by the user to the sides of the screen to expose more characters, for example, by a sliding movement of the user's finger or a stylus, and/or by arrow buttons presented at the sides of each character row. This may be used, for example, when the set of characters for a character row is too big to fit in the screen.

Now, as shown at 105, a set of user selected characters is constructed from the characters selected by the user on each character row.

Then, as shown at 106, the set of user selected characters is converted to input, as required by the input field. This may optionally be performed by a processing unit.

Optionally, as shown at 107, the user alters the input by selecting a single character in one of the character rows. The selection then changes the respective character corresponding to that character row in the set of user selected characters. The set is then converted again to input, as shown at 106.

Figure 2:
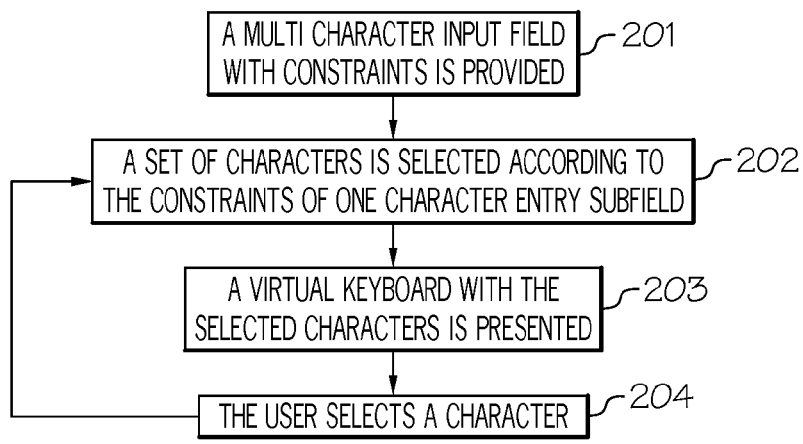
FIG. 2 is a flowchart schematically representing a method enabling a user to fill an input field, according to some embodiment of the present invention.

Reference is now made to FIG. 2, which is a flowchart schematically representing a method enabling a user to fill in data in an input field, according to some embodiment of the present invention.

First, as shown at 201, a multi character input field with constraints is provided. For example, an input field requiring a date of birth has constraints of characters for the year, month and day; or, an input field requiring a name of a product in a store has constraints of letters according to the existing products in the store.

Then, as shown at 202, a set of characters is selected according to the constraints of one character entry subfield. For example, the character entry subfield for the first character of a year of birth may only accept the digits "1" or "2".

Then, as shown at 203, a virtual keyboard with the selected characters is presented to the user. Optionally, the set of characters for each character entry subfields are presented separately, for example, when the virtual keyboard is a block of characters where only the selected characters are active and others are grayed. Optionally, the sets of characters for some of the character entry subfields are presented simultaneously, for example, when the virtual keyboard is a set of character rows as described above.

Now, as shown at 204, the user selects a character for the character entry subfield from the set of characters presented on the virtual keyboard.

Then, a new set of characters is selected according to the constraints of the next character entry subfield of the input field, as shown at 202. Optionally, the virtual keyboard is dynamically changed in size, shape, length and/or position according to the character selected by the user.

Optionally, the input field is automatically filled when only one option for filling the input field exists according to the constraint and the characters previously selected by the user. This saves user typing and time, as the user does not have to manually enter the entire input.

Figure 3:
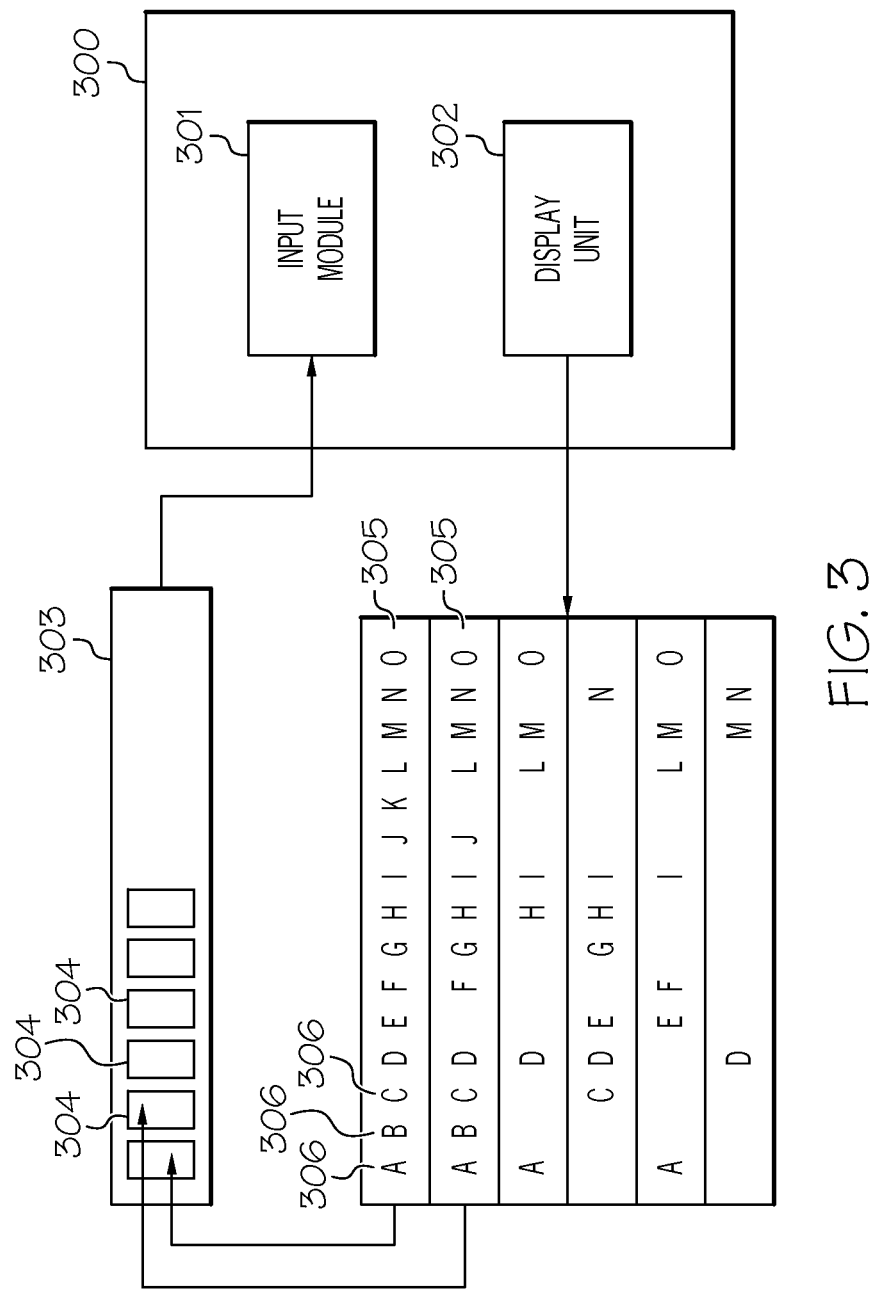
FIG. 3 schematically illustrates a system for creating a virtual keyboard for input in an input field, according to some embodiment of the present invention.

Reference is now made to FIG. 3 which schematically illustrates a system for creating a virtual keyboard for input in an input field, according to some embodiment of the present invention. System 300 contains an input module 301 which receives input from a user through input field 303. Input module 301 may be a hardware component, for example, a touch detection unit of a mobile device, and/or a software component, for example, as part of an operation system of a personal computer. Input field 303 contains character entry subfields 304, some having constraints on the possible characters that may be entered to it. System 300 also contains a display unit 302 which instructs the rendering of character rows 305 on a screen. Each of the character rows 305 contains a set of characters 306, for example, letters of the alphabet. Each of the character rows 305 provides input for one of the character entry subfields 304. Each set of characters 306 is selected dynamically according to the constraints of the respective character entry subfield 304. A user then selects one character in each character row to be provided as input to the corresponding character entry subfield. The input is then received by input module 301.

Figure 4A:
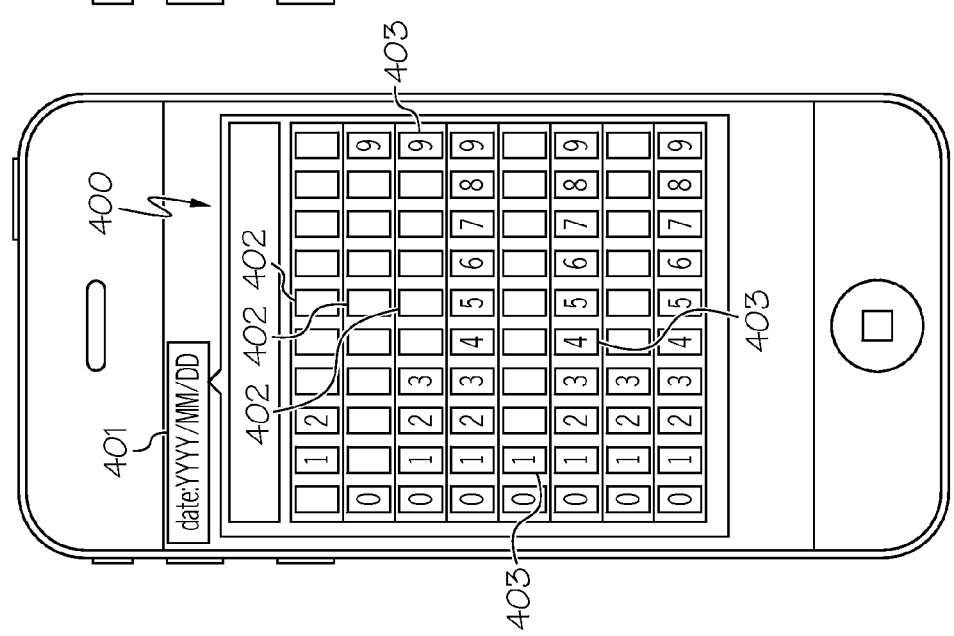
FIG. 4A is an exemplary touch screen virtual keyboard, according to some embodiment of the present invention.

Reference is now made to FIG. 4A which is an exemplary touch screen virtual keyboard, according to some embodiment of the present invention.

Virtual keyboard 400 includes an input field 401 having a character entry subfields with at least one constraint for one of the character entry subfields and character rows 402 each containing a set of characters 403.

In an exemplary process of generating a character input, input field 401 requires an input of a date in the format of YYYYMMDD (for example 19981231) with the year ranging from 1990 to 2038. As the user presses input field 401, the screen shown in FIG. 3A is presented. The first character row contains only the set of characters containing digits "1" and "2", as only these are possible for the first digit of the year.

Optionally, the character selected by the user in one character row affects the set of characters that are presented in other character rows. For example, if the user selects digit "1" in the first character row, the second character row changes to show only the digit "9", as the required year input is from 1990 to 2038.

Figure 4B:
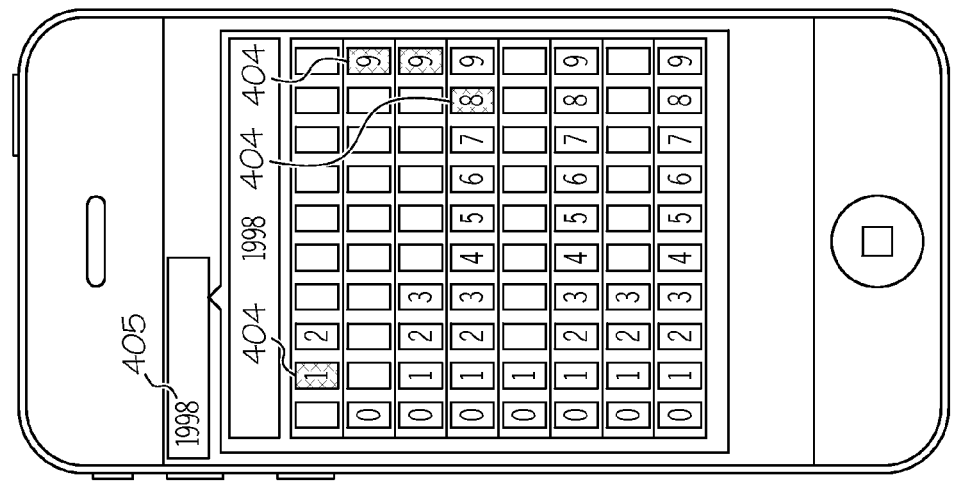
FIG. 4B is an exemplary touch screen virtual keyboard with user selected characters, according to some embodiment of the present invention.

Optionally, as shown in FIG. 4B, indications 404 for the characters selected by the user may be added. Also, as shown in 405, the characters selected by the user are presented on input field 401.

Figure 4C:
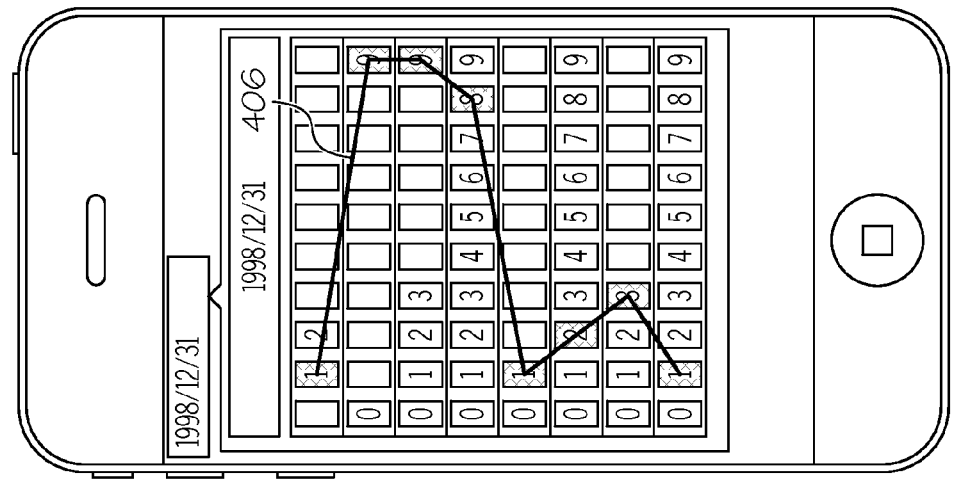
FIG. 4C is an exemplary touch screen virtual keyboard which illustrates a path of the user's finger on the touch screen, according to some embodiment of the present invention.

Reference is now made to FIG. 4C which illustrates path 306 of the user's finger on the touch screen when selecting the exemplary input 19981231.

Optionally, a change of a character is made by the user in an existing set of user selected characters by touching a new character in one of the character rows. For example, as the user selects input field 401 with an already entered input of 19981231, virtual keyboard 400 is presented with indications 404 for the user selected characters. The user then touches, for example, the character "9" in the fourth character row, and the input changes to 19991231. This improves existing methods of changing an input, where a user must select the exact character in the input field to be replaced before replacing it with a new character.

In another exemplary process of generating a character input, according to some embodiment of the present invention, a street name of a specific city has to be entered in an input field of an application of a tablet computer. When a user selects the input field, the input field is presented at the top of the tablet touch screen and multiple character rows are presented below the input field. Each character row contains a set of all characters of the letters in alphabetic order. When the user touches a letter in the first character row, for example the letter "D", the letter is selected and is presented in the input field at the top of the screen. A processing unit then selects an updated set of characters to be presented in the second character row, according to constraints determined by the streets existing in the specific city. For example, if there are only four streets with names beginning with a "D" in the specific city, with second letters "A", "A" "I" and "O", only the letters "A", "I" and "O" are presented in the second character row. The next character rows are also updated according to the possible letters in the street names. The user then touches a letter in the second character row, for example, the letter "O". As there is only one street with a name starting with the letters "DO", the processing unit selects the street's name and the completed name is presented in the input field at the top of the screen.

In yet another exemplary process of generating a character input, according to some embodiment of the present invention, a user using a browser program on a personal computer is loading a web document containing multiple input fields. When the user selects an input field, a program window opens on the screen, containing multiple character rows. Then the user clicks on a character in each character row, and an input is constructed in the input field. After one input field is completed, character rows for the next input field are presented on the screen.

In one embodiment of the present invention, the methods as described above are used in the fabrication of integrated circuit chips.

Figure 5:
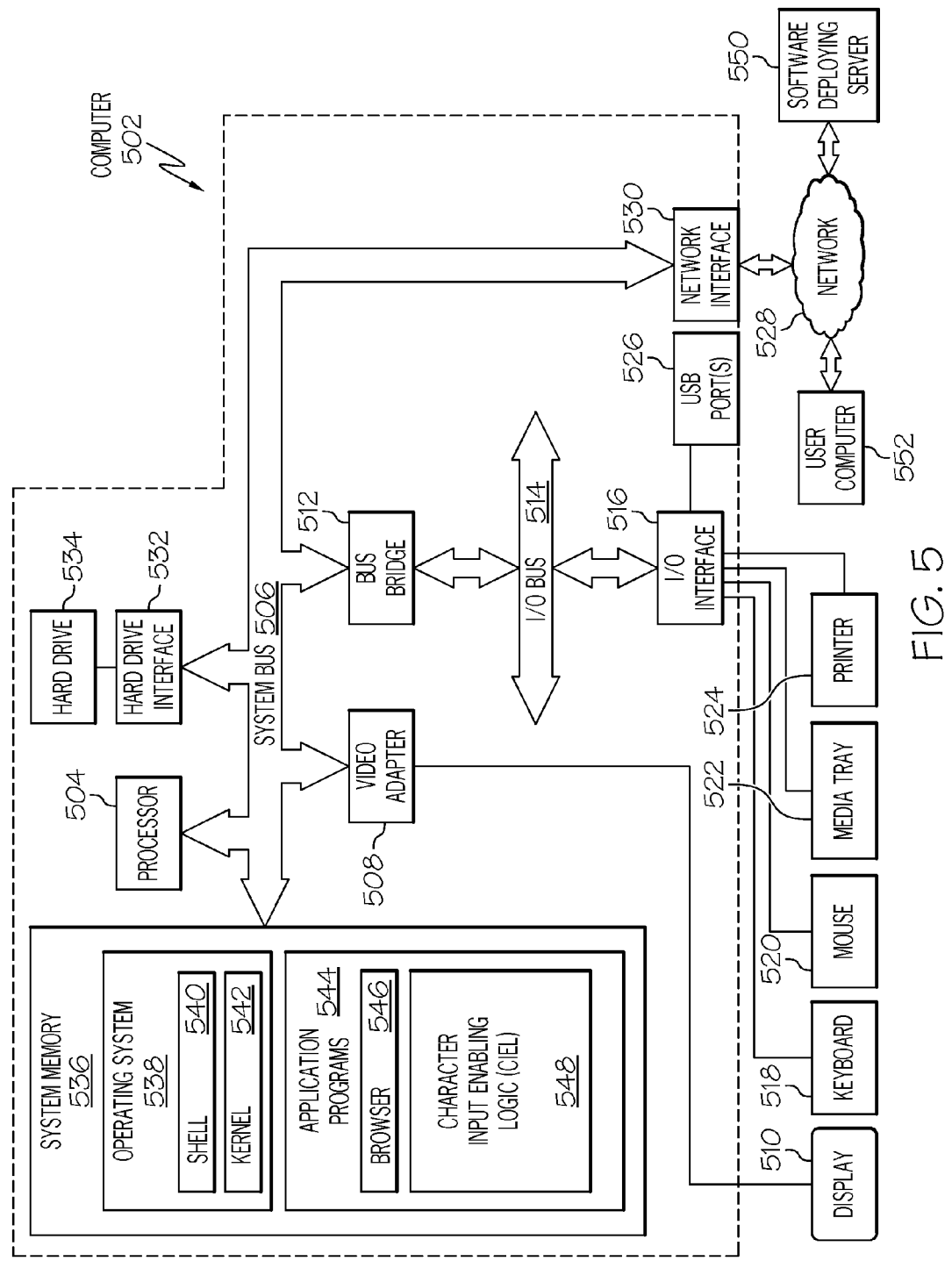
FIG. 5 depicts an exemplary system and network in which the present disclosure may be implemented.

With reference now to FIG. 5, there is depicted a block diagram of an exemplary system and network that may be utilized by and/or in the implementation of the present invention. Note that some or all of the exemplary architecture, including both depicted hardware and software, shown for and within computer 502 may be utilized by software deploying server 550 and/or a user computer 552 (e.g., system 300 depicted in FIG. 3 and/or any computing device capable of displaying the virtual keyboard 400 depicted in FIGS. 4A-4C).

Exemplary computer 502 includes a processor 504 that is coupled to a system bus 506. Processor 504 may utilize one or more processors, each of which has one or more processor cores. A video adapter 508, which drives/supports a display 510, is also coupled to system bus 506. System bus 506 is coupled via a bus bridge 512 to an input/output (I/O) bus 514. An I/O interface 516 is coupled to I/O bus 514. I/O interface 516 affords communication with various I/O devices, including a keyboard 518, a mouse 520, a media tray 522 (which may include storage devices such as CD-ROM drives, multi-media interfaces, etc.), a printer 524, and external USB port(s) 126. While the format of the ports connected to I/O interface 516 may be any known to those skilled in the art of computer architecture, in one embodiment some or all of these ports are universal serial bus (USB) ports.

As depicted, computer 502 is able to communicate with a software deploying server 550 and/or user computer 552, using a network interface 530. Network interface 530 is a hardware network interface, such as a network interface card (NIC), etc. Network 528 may be an external network such as the Internet, or an internal network such as an Ethernet or a virtual private network (VPN).

A hard drive interface 532 is also coupled to system bus 506. Hard drive interface 532 interfaces with a hard drive 534. In one embodiment, hard drive 534 populates a system memory 536, which is also coupled to system bus 506. System memory is defined as a lowest level of volatile memory in computer 502. This volatile memory includes additional higher levels of volatile memory (not shown), including, but not limited to, cache memory, registers and buffers. Data that populates system memory 536 includes computer 502's operating system (OS) 538 and application programs 544.

OS 538 includes a shell 540, for providing transparent user access to resources such as application programs 544. Generally, shell 540 is a program that provides an interpreter and an interface between the user and the operating system. More specifically, shell 540 executes commands that are entered into a command line user interface or from a file.

Thus, shell 540, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 542) for processing. Note that while shell 540 is a text-based, line-oriented user interface, the present invention will equally well support other user interface modes, such as graphical, voice, gestural, etc.

As depicted, OS 538 also includes kernel 542, which includes lower levels of functionality for OS 538, including providing essential services required by other parts of OS 538 and application programs 544, including memory management, process and task management, disk management, and mouse and keyboard management.

Application programs 544 include a renderer, shown in exemplary manner as a browser 546. Browser 546 includes program modules and instructions enabling a world wide web (WWW) client (i.e., computer 502) to send and receive network messages to the Internet using hypertext transfer protocol (HTTP) messaging, thus enabling communication with software deploying server 550 and other computer systems.

Application programs 544 in computer 502's system memory (as well as software deploying server 550's system memory) also include a character input enabling logic (CIEL) 548. CIEL 548 includes code for implementing the processes described below, including those described in FIG. 1-FIG. 4C. In one embodiment, computer 502 is able to download CIEL 548 from software deploying server 550, including in an on-demand basis, wherein the code in CIEL 548 is not downloaded until needed for execution. Note further that, in one embodiment of the present invention, software deploying server 550 performs all of the functions associated with the present invention (including execution of CIEL 548), thus freeing computer 502 from having to use its own internal computing resources to execute CIEL 548.

Note that the hardware elements depicted in computer 502 are not intended to be exhaustive, but rather are representative to highlight essential components required by the present invention. For instance, computer 502 may include alternate memory storage devices such as magnetic cassettes, digital versatile disks (DVDs), Bernoulli cartridges, and the like. These and other variations are intended to be within the spirit and scope of the present invention.

As described herein, according to an aspect of some embodiments of the present invention there is provided a method of generating a character input from an interface, comprising: presenting simultaneously on a single display a plurality of consecutive character rows to a user, each one of the plurality of character rows comprises a set of characters; selecting by a user a single character in each one of the plurality of character rows to generate a set of user selected characters; and converting the set of user selected characters to a single complete input.

In one embodiment of the present invention, the display is a touch screen.

In one embodiment of the present invention, the selecting by a user is received from a touch detection unit.

In one embodiment of the present invention, the set of characters in each one of the plurality of character rows is presented in a predetermined order.

In one embodiment of the present invention, the selecting by a user is performed by a maneuvered stroke held on top of the plurality of character rows so that the stroke covers a single character in each one of the plurality of character rows.

In one embodiment of the present invention, the set of characters is identical in each one of the plurality of character rows.

In one embodiment of the present invention, the plurality of character rows are presented in response to a user selection of an input field.

In one embodiment of the present invention, the set of characters in each one of the plurality of character rows is selected according to the type of input required by the input field.

In one embodiment of the present invention, the input field has a plurality of character entry subfields and at least one constraint for at least one of the plurality of character entry subfields; and the set of characters in each one of the plurality of character rows is selected dynamically according to the least one constraint of the at least one of the plurality of character entry subfields.

In one embodiment of the present invention, at least one of the plurality of character rows is of different size then at least one of the plurality of character rows according to the least one constraint of the at least one of the plurality of character entry subfields.

In one embodiment of the present invention, the set of user selected characters is presented inside the input field.

In one embodiment of the present invention, the plurality of character rows move on the single display while the user selects characters and new character rows are presented on the single display.

In one embodiment of the present invention, one character of the input is altered by the user by selecting a single character in one of the plurality of character rows.

According to an aspect of some embodiments of the present invention there is provided computer readable medium comprising computer executable instructions adapted to perform the method.

According to an aspect of some embodiments of the present invention there is provided a method for enabling a user to fill an input field on a single display, comprising: providing an input field having a plurality of character entry subfields and at least one constraint for at least one of the plurality of character entry subfields; selecting a set of characters for input in the input field according to the at least one constraint of at least one of the plurality of character entry subfields; and presenting a virtual keyboard on a single display, wherein only the set of characters are presented on the virtual keyboard.

In one embodiment of the present invention, the set of characters are presented separately for each one of the plurality of character entry subfields.

In one embodiment of the present invention, the set of characters is changed according to characters previously selected by the user.

In one embodiment of the present invention, the set of characters are presented simultaneously on the virtual keyboard for each of the plurality of character entry subfields.

In one embodiment of the present invention, the virtual keyboard is changed in at least one of size, shape and position according to the set of characters.

In one embodiment of the present invention, the virtual keyboard comprises a plurality of consecutive character rows, each one of the plurality of character rows comprises the set of characters corresponding to each one of the plurality of character entry subfields.

In one embodiment of the present invention, wherein the input field is automatically filled when only one option for filling the input field exists according to the at least one constraint and characters previously selected by the user.

According to an aspect of some embodiments of the present invention there is provided a computerized system for creating a virtual keyboard for input in an input field, comprising: an input module for receiving input using an input field having a plurality of character entry subfields and at least one constraint for at least one of the plurality of character entry subfields; a display unit creating a plurality of character rows, each of the plurality of character rows comprises a set of characters; wherein each of the plurality of character rows provides input for one of the character entry subfields; wherein the set of characters in each one of the plurality of character rows is selected dynamically according to respective the at least one constraint.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems of generating character input from an interface will be developed and the scope of the term character input is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of generating a numeric input from an interface, the method comprising:
   presenting, simultaneously on a single display, a plurality of consecutive numeric rows to a user, wherein each one of said plurality of consecutive numeric rows comprises a set of numerals that are specific to a particular subfield in an input field displayed on the single display, wherein the input field is for a numeric representation of a date, and wherein the plurality of consecutive numeric rows are displayed vertically such that a first numeric row from the plurality of consecutive numeric rows contains only numerals that may be used as a numeral for a respective first entry subfield in the numeric representation of the date;
   receiving, by one or more processors, a selection by the user of a single numeral from each one of said plurality of consecutive numeric rows to generate a set of user selected numerals for the input field, wherein a user selection of a numeral from a first numeric row determines predicted numerals of a second numeric row from the plurality of consecutive numeric rows according to a constraint on the second numeral for a respective second entry subfield in the numeric representation of the date that is based on the user selection of the numeral from the first numeric row;
   converting, by one or more processors, said set of user selected numerals to a single complete input; and
   displaying, by one or more processors, all other numeric rows, beyond the first numeric row and the second numeric row, from the plurality of consecutive numeric rows according to each of constraints corresponding to each of said all other numeric rows for each respective entry subfield in the numeric representation of the date, wherein each subsequent numeric row is adjusted according to which numeral for a respective numeric entry subfield is selected by the user from a preceding numeric row until all numeric entry subfields in the input field are filled for the numeric representation of the date.

2. The method of claim 1, wherein each of said plurality of consecutive character rows is presented in a predetermined order that matches an order of characters in an input field.

3. The method of claim 1, wherein the single display is a touch screen, and wherein said selection by the user is performed by a maneuvered stroke held on top of said plurality of consecutive character rows so that said stroke inputs a single character from each one of said plurality of consecutive character rows.

4. The method of claim 1, wherein the input field is for a numeric representation of a date, wherein the plurality of consecutive character rows are displayed vertically such that a top character row from the multiple character rows contains possible numerals for a first numeral in the numeric representation of the date and a bottom numeric row from the multiple numeric rows contains possible numerals for a last numeral in the numeric representation of the date.

5. The method of claim 1, wherein the plurality of consecutive character rows are multiple numeric rows, wherein the input field is for a numeric representation of a date, and wherein the method further comprises:
   visually encoding, by one or more processors, each numeral selected by the user from each of the multiple numeric rows, wherein said visually encoding alters an appearance of each numeral selected while continuing to display on the user interface said each numeral selected by the user.

6. The method of claim 1, wherein said set of user selected characters in each one of said plurality of consecutive character rows is selected according to a type of input required by said input field.

7. The method of claim 1, wherein said set of user selected characters is presented inside said input field.

8. The method of claim 1, wherein said plurality of consecutive character rows move on said single display while said user selects characters and new character rows are presented on said single display.

9. The method of claim 1, the method comprising:
   presenting a virtual keyboard on a single display, wherein only said set of user selected characters is presented on said virtual keyboard.

10. A computer program product comprising one or more non-transitory computer readable storage mediums, and program instructions stored on at least one of the one or more non-transitory computer readable storage mediums, the stored program instructions comprising:
    program instructions to present, simultaneously on a single display, a plurality of consecutive numeric rows to a user, wherein each one of said plurality of consecutive numeric rows comprises a set of numerals that are specific to a particular subfield in an input field displayed on the single display, wherein the input field is for a numeric representation of a date, and wherein the plurality of consecutive numeric rows are displayed vertically such that a first numeric row from the plurality of consecutive numeric rows contains only numerals that may be used as a numeral for a respective first entry subfield in the numeric representation of the date;
    program instructions to receive, by one or more processors, a selection by the user of a single numeral from each one of said plurality of consecutive numeric rows to generate a set of user selected numerals for the input field, wherein a user selection of a numeral from a first numeric row determines predicted numerals of a second numeric row from the plurality of consecutive numeric rows according to a constraint on the second numeral for a respective second entry subfield in the numeric representation of the date that is based on the user selection of the numeral from the first numeric row;
    program instructions to convert said set of user selected numerals to a single complete input; and
    displaying, by one or more processors, all other numeric rows, beyond the first numeric row and the second numeric row, from the plurality of consecutive numeric rows according to each of constraints corresponding to each of said all other numeric rows for each respective entry subfield in the numeric representation of the date, wherein each subsequent numeric row is adjusted according to which numeral for a respective numeric entry subfield is selected by the user from a preceding numeric row until all numeric entry subfields in the input field are filled for the numeric representation of the date.

11. The computer program product of claim 10, wherein each of said plurality of consecutive character rows is presented in a predetermined order that matches an order of characters in an input field.

12. The computer program product of claim 10, wherein the single display is a touch screen, and wherein said selection by the user is performed by a maneuvered stroke held on top of said plurality of consecutive character rows so that said stroke inputs a single character from each one of said plurality of consecutive character rows.

13. The computer program product of claim 10, wherein the input field is for a numeric representation of a date, wherein the plurality of consecutive character rows are displayed vertically such that a top character row from the multiple character rows contains possible numerals for a first numeral in the numeric representation of the date and a bottom numeric row from the multiple numeric rows contains possible numerals for a last numeral in the numeric representation of the date.

14. The computer program product of claim 10, wherein the plurality of consecutive character rows are multiple numeric rows, wherein the input field is for a numeric representation of a date, and wherein the computer program product further comprises:
program instructions to visually encode each numeral selected by the user from each of the multiple numeric rows, wherein said visually encoding alters an appearance of each numeral selected while continuing to display on the user interface said each numeral selected by the user.

15. A computer system comprising one or more processors, one or more computer readable memories, and one or more non-transitory computer readable storage mediums, and program instructions stored on at least one of the one or more non-transitory computer readable storage mediums for execution by at least one of the one or more processors via at least one of the one or more memories, the stored program instructions comprising:
program instructions to present, simultaneously on a single display, a plurality of consecutive numeric rows to a user, wherein each one of said plurality of consecutive numeric rows comprises a set of numerals that are specific to a particular subfield in an input field displayed on the single display, wherein the input field is for a numeric representation of a date, and wherein the plurality of consecutive numeric rows are displayed vertically such that a first numeric row from the plurality of consecutive numeric rows contains only numerals that may be used as a numeral for a respective first entry subfield in the numeric representation of the date;
program instructions to receive, by one or more processors, a selection by the user of a single numeral from each one of said plurality of consecutive numeric rows to generate a set of user selected numerals for the input field, wherein a user selection of a numeral from a first numeric row determines predicted numerals of a second numeric row from the plurality of consecutive numeric rows according to a constraint on the second numeral for a respective second entry subfield in the numeric representation of the date that is based on the user selection of the numeral from the first numeric row;
program instructions to convert said set of user selected numerals to a single complete input; and
displaying, by one or more processors, all other numeric rows, beyond the first numeric row and the second numeric row, from the plurality of consecutive numeric rows according to each of constraints corresponding to each of said all other numeric rows for each respective entry subfield in the numeric representation of the date, wherein each subsequent numeric row is adjusted according to which numeral for a respective numeric entry subfield is selected by the user from a preceding numeric row until all numeric entry subfields in the input field are filled for the numeric representation of the date.

16. The computer system of claim 15, wherein each of said plurality of consecutive character rows is presented in a predetermined order that matches an order of characters in an input field.

17. The computer system of claim 15, wherein the single display is a touch screen, and wherein said selection by the user is performed by a maneuvered stroke held on top of said plurality of consecutive character rows so that said stroke inputs a single character from each one of said plurality of consecutive character rows.

18. The computer system of claim 15, wherein the input field is for a numeric representation of a date, wherein the plurality of consecutive character rows are displayed vertically such that a top character row from the multiple character rows contains possible numerals for a first numeral in the numeric representation of the date and a bottom numeric row from the multiple numeric rows contains possible numerals for a last numeral in the numeric representation of the date.

19. The computer system of claim 15, wherein the plurality of consecutive character rows are multiple numeric rows, wherein the input field is for a numeric representation of a date, and wherein the computer system further comprises:
program instructions to visually encode each numeral selected by the user from each of the multiple numeric rows, wherein said visually encoding alters an appearance of each numeral selected while continuing to display on the user interface said each numeral selected by the user.

* * * * *